United States Patent
Cook et al.

(10) Patent No.: US 8,805,372 B2
(45) Date of Patent: Aug. 12, 2014

(54) SYSTEMS AND METHODS FOR RESELECTING CELLS IN A CELLULAR WIRELESS COMMUNICATION SYSTEM

(75) Inventors: Jonathan Richard Cook, Saratoga, CA (US); Mohit Narang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 669 days.

(21) Appl. No.: 12/408,634

(22) Filed: Mar. 20, 2009

(65) Prior Publication Data

US 2010/0240371 A1    Sep. 23, 2010

(51) Int. Cl.
*H04Q 7/20* (2006.01)

(52) U.S. Cl.
USPC ........ 455/436; 455/63.4; 455/562.1; 455/524

(58) Field of Classification Search
USPC ................ 455/63.4, 524, 436, 437, 443, 562; 370/232, 253, 331–333
See application file for complete search history.

(56) References Cited

U.S. PATENT DOCUMENTS

| | | | | |
|---|---|---|---|---|
| 5,966,657 | A * | 10/1999 | Sporre | 455/425 |
| 6,360,098 | B1 * | 3/2002 | Ganesh et al. | 455/436 |
| 2003/0190916 | A1 | 10/2003 | Celedon et al. | |
| 2006/0140117 | A1 * | 6/2006 | Aerrabotu et al. | 370/232 |
| 2008/0004023 | A1 | 1/2008 | Chen et al. | |
| 2008/0220784 | A1 | 9/2008 | Somasundaram et al. | |
| 2009/0047958 | A1 * | 2/2009 | Rimhagen et al. | 455/436 |
| 2009/0069015 | A1 * | 3/2009 | Yamamoto et al. | 455/437 |
| 2009/0111381 | A1 * | 4/2009 | Johnson et al. | 455/63.4 |

FOREIGN PATENT DOCUMENTS

| | | |
|---|---|---|
| GB | 2331891 | 6/1999 |
| GB | 2337426 | 11/1999 |
| WO | 2005050899 A2 | 6/2005 |

OTHER PUBLICATIONS

Digital cellular telecommunications system (Phase 2+); Mobile radio interface layer 3 specification (3GPP TS 04.08 version 7.21.0 Release 1998); ETSI TS 100 940 ETSI Standards, LIS, Sophia Antipolis Cedex, France, vol. 3-CN1, No. V7.21.0, Dec. 1, 2003, XP014015836 ISSN: 0000-0001 p. 55, paragraph 3.4.1.1—p. 56, paragraph 3.4.1.2 p. 277, paragraph 9.1.21 p. 291, paragraph 9.1. 37—p. 292, paragraph 9.1.37 p. 437, paragraph 10.5.2.20—p. 441, paragraph 10.5.2.20.
International Search Report and Written Opinion—PCT/US2010/028179, International Search Authority—European Patent Office—Jul. 30, 2010.
Taiwan Search Report—TW099108238—TIPO—Apr. 25, 2013.

* cited by examiner

*Primary Examiner* — Patrick Edouard
*Assistant Examiner* — Julio Perez
(74) *Attorney, Agent, or Firm* — Linda G. Gunderson

(57) ABSTRACT

Systems and methods include reselecting and handing over a mobile communication device from a first cell to a second cell in a cellular wireless communication system based on determining whether the signal quality level of the second cell meets or exceeds a signal quality threshold.

29 Claims, 8 Drawing Sheets

SYSTEMS AND METHODS FOR RESELECTING CELLS IN A CELLULAR WIRELESS COMMUNICATION SYSTEM

BACKGROUND

1. Field

The described aspects relate generally to systems and methods for reselecting and handing over a mobile communication device from a first cell to a second cell in a cellular wireless communication system. In particular, the described aspects relate to criteria for selecting a second cell while a mobile device is on or otherwise interacting with and/or controlled by a first cell.

2. Background

Cellular wireless communication systems generally comprise a number of radio transceivers, or base stations, that define service areas or cells. The schematic diagram in FIG. 1 illustrates a system 100 comprising four base stations 120 defining respective cells 110. The cells typically overlap in order to ensure continuous coverage of service in the service area. Cellular systems are designed specifically to accommodate users as they move around within the system. Thus, mobile communications devices 130 may interact with various base stations as the devices move through the respective cells 110 of the system 100.

As a mobile station is moved from the service area defined by one cell into that defined by another, the system and the mobile station must break the connection with one base station and establish a connection with another base station while minimizing the connection loss between the mobile station and the system. This operation is sometimes known as a cell reselection, a handoff or a handover. The term "camped on" is commonly used, and will be used hereinafter, to describe the base station with which, and respective cell in which, a mobile station is operating. That is, a cell reselection involves a mobile station moving from being camped on one cell to being camped on another cell.

Typically, a cell reselection can be initiated either by the mobile station or by the cellular system. How reselection is initiated can depend on factors such as the kind of cellular system, its mode of operation and on the capabilities of a mobile station. In any event, reselection is typically initiated either as a result of a service degradation, which tends to lead to increased power consumption requirements, or there being an opportunity to improve the service, which would lead to reduced power consumption requirements. Especially since many mobile stations operate from battery power, an opportunity to reduce power consumption, thereby improving power efficiency, is usually advantageous. Service degradation can result from factors such as increasing distance between a mobile station and a base station or natural or man-made obstructions such as hills or buildings, respectively.

One known kind of reselection operation requires a mobile station to monitor the signaling level of cells that neighbor the cell (NCELLs) on which the mobile station is camped, which will be referred to hereinafter as the "serving cell". Such reselection operation compares the monitored signaling levels of the NCELLs with the signaling level of the serving cell. Then, if the signaling level of a NCELL is deemed by the mobile station to be better than that of the serving cell, for at least a predefined period of time (say, five seconds), the mobile station initiates a reselection to the respective NCELL, which becomes the new serving cell.

The reselection operation discussed above initiates reselection based upon the NCELL's signaling level. Thus, a mobile device may be handed over to a NCELL with a stronger signaling level but having a poor signal quality, resulting in a dropped call.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for handing a mobile station from a first cell to a selected neighbor cell in a GSM cellular wireless communication system. The method may include receiving a neighbor list from the GSM cellular wireless communication system. The method may also include determining a signal power level of at least one neighbor cell from the neighbor list. Further, the method may include determining a signal quality level of the at least one neighbor cell from the neighbor list. In addition, the method may include determining whether the signal quality level of the at least one neighbor cell is above a signal quality threshold. Moreover, the method may include including the at least one neighbor cell on a potential handover candidate list if the signal quality level is above the signal quality threshold. The method may also include ranking the potential handover candidate list based upon the power level of the neighbor cells included in the potential handover candidate list. Additionally, the method may include forwarding the potential handover candidate list to the GSM cellular wireless communication system, wherein the potential handover list is operable for use by the GSM cellular wireless communication system to determine where to handover the mobile station.

Another aspect relates to at least one processor configured to hand a mobile station from a first cell to a selected neighbor cell in a GSM cellular wireless communication system. The processor may include a first module for receiving a neighbor list from the GSM cellular wireless communication system. In addition, the processor may include a second module for determining a signal power level of at least one neighbor cell. Moreover, the processor may include a third module for determining a signal quality level of the at least one neighbor cell. Additionally, the processor may include a fourth module for determining whether the signal quality level of the at least one neighbor cell is above a signal quality threshold. The processor may also include a fifth module for including the at least one neighbor cell on the potential handover candidate list if the signal quality level is above the signal quality threshold. Further, the processor may include a sixth module for ranking the potential handover candidate list based upon the power level of the neighbor cells included in the potential handover candidate list. Furthermore, the processor may include a seventh module for forwarding the potential handover candidate list to the GSM cellular wireless communication system, wherein the potential handover list is operable for use by the GSM cellular wireless communication system to determine where to handover the mobile station.

Yet another aspect relates to a computer program product configured to hand a mobile station from a first cell to a selected neighbor cell in a GSM cellular wireless communication system. The computer program may include a computer-readable medium including a first set of codes for causing a computer to receive a neighbor list from the GSM cellular wireless communication system. The computer-readable medium may also include a second set of codes for causing a computer to determine a signal power level of at least one neighbor cell. Further, the computer-readable medium may include a third set of codes for causing a computer to determine a signal quality level of the at least one neighbor cell. Additionally, the computer-readable medium may include a fourth set of codes for causing a computer to determine whether the signal quality level of the at least one neighbor cell is above a signal quality threshold. Moreover, the computer readable-medium may include a fifth set of codes for causing a computer to include the at least one neighbor cell on the potential handover candidate list if the signal quality level is above the signal quality threshold. Furthermore, the computer-readable medium may include a sixth set of codes for causing a computer to rank the potential handover candidate list based upon the power level of the neighbor cells included in the potential handover candidate list. In addition, the computer-readable medium may include a seventh set of codes for causing a computer to forward the potential handover candidate list to the GSM cellular wireless communication system, wherein the potential handover list is operable for use by the GSM cellular wireless communication system to determine where to handover the mobile station.

Another aspect relates to an apparatus. The apparatus may include means for receiving a neighbor list from the GSM cellular wireless communication system. The apparatus may also include means for determining a signal power level of at least one neighbor cell. Further, the apparatus may include means for determining a signal quality level of the at least one neighbor cell. In addition, the apparatus may include means for determining whether the signal quality level of the at least one neighbor cell is above a signal quality threshold. The apparatus may also include means for including the at least one neighbor cell on the potential handover candidate list if the signal quality level is above the signal quality threshold. Moreover, the apparatus may include means for ranking the potential handover candidate list based upon the power level of the neighbor cells included in the potential handover candidate list. Furthermore, the apparatus may include means for forwarding the potential handover candidate list to the GSM cellular wireless communication system, wherein the potential handover list is operable for use by the GSM cellular wireless communication system to determine where to handover the mobile station.

Yet another aspect relates to an apparatus. The apparatus may include a receiver operable to receive a neighbor list from the GSM cellular wireless communication system. Further, the apparatus may include a handover manger component operable to determine a signal power level of at least one neighbor cell. Additionally, the apparatus may include the handover manager component operable to determine a signal quality level of the at least one neighbor cell. Moreover, the apparatus may include the handover manager component operable to determine whether the signal quality level of the at least one neighbor cell is above a signal quality threshold. The apparatus may also include the handover manager component operable to include the at least one neighbor cell on the potential handover candidate list if the signal quality level is above the signal quality threshold. In addition, the apparatus may include the handover manger component operable to ranking the potential handover candidate list based upon the power level of the neighbor cells included in the potential handover candidate list. Furthermore, the apparatus may include a transmitter operable to forward the potential handover candidate list to the GSM cellular wireless communication system, wherein the potential handover list is operable for use by the GSM cellular wireless communication system to determine where to handover the mobile station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
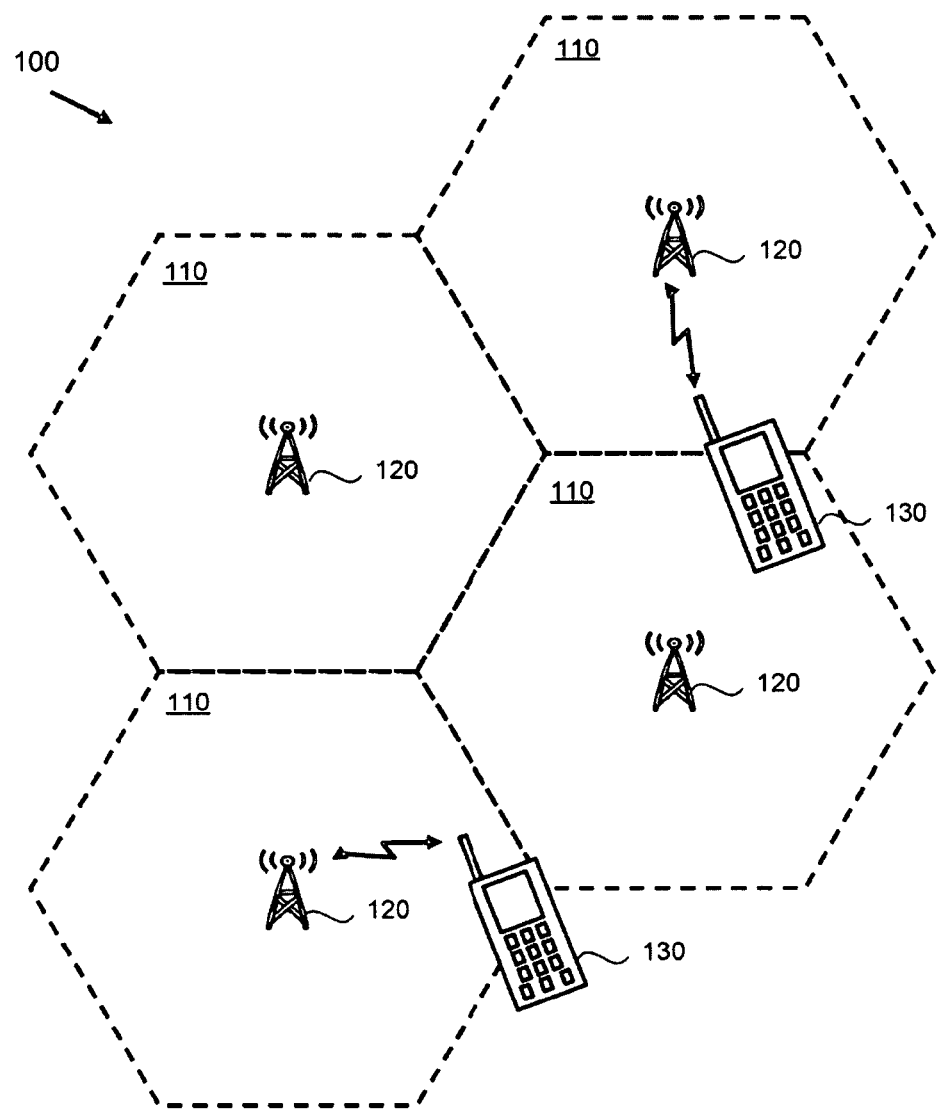
FIG. 1 is a schematic diagram illustrating a cellular wireless communications system in accordance with one aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Figure 2:
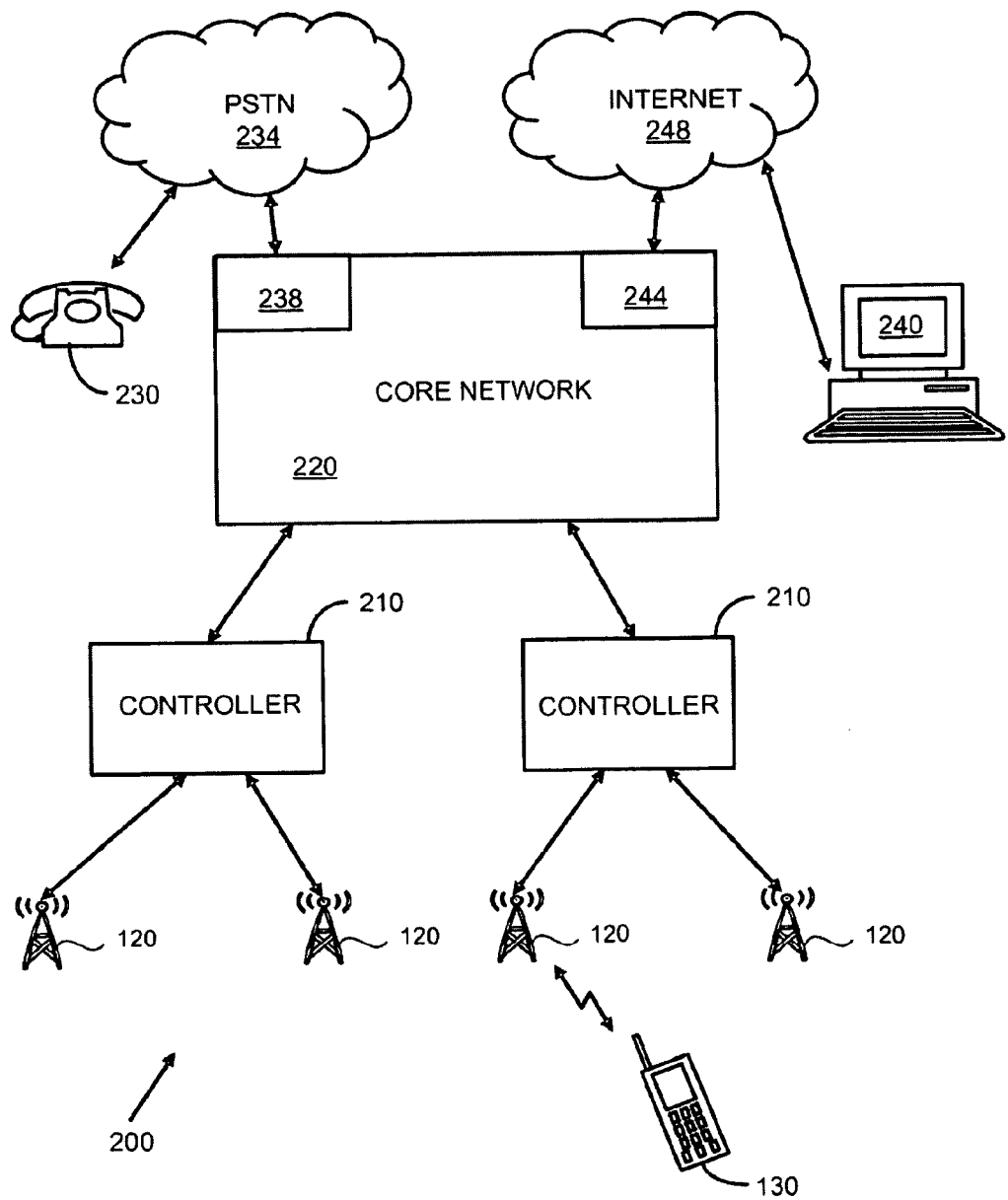
FIG. 2 is a high level block diagram illustrating the main components in a cellular wireless communications system in accordance with an aspect.

Referring now to the schematic diagram in FIG. 2, illustrated is a high level block diagram of a wireless cellular communications system 200, for example as partially shown in FIG. 1. System 200 includes four base stations 120, which provide access to the system for mobile device 130. As discussed above, mobile device 130, for example, may be a cellular telephone, a satellite phone, a personal digital assistant (PDA), a handheld device having wireless connection capability, a computing device, among other processing devices connected to a wireless modem. Each base station 120 is controlled by a controller 210 and each controller 210 is connected to a core network 220 of the system, via an appropriate communications infrastructure. Each controller 210 can control one base station 120 but typically a controller controls more than one base station. The core network 220 in general contains the infrastructure, components and functionality for controlling the controllers 210; routing calls and connections of all kinds from and to mobile device 130; routing calls and connections from mobile device 130 to other systems and terminating equipment; and receiving calls and connections, from other systems and terminating equipment, which are intended for mobile devices. Examples of other terminating equipment are traditional telephone equipment 230, which are connected to via a Public Switched Telephone Network (PSTN) 234 and PSTN gateway 238 of the core network 220, Internet servers 240, which are connected to via an Internet gateway 244 and a pocket switching network 248 such as the Internet, and other telecommunications systems or services (not shown), such as voicemail or corporate networks respectively.

There are various kinds of wireless cellular communication systems, which operate according to different standards. Such systems and standards include, but are not limited to, GSM (Global System for Mobile Communication). For illustrative purposes, particular aspects of the present invention will now be described in relation to cell reselection in a GSM system.

Figure 3:
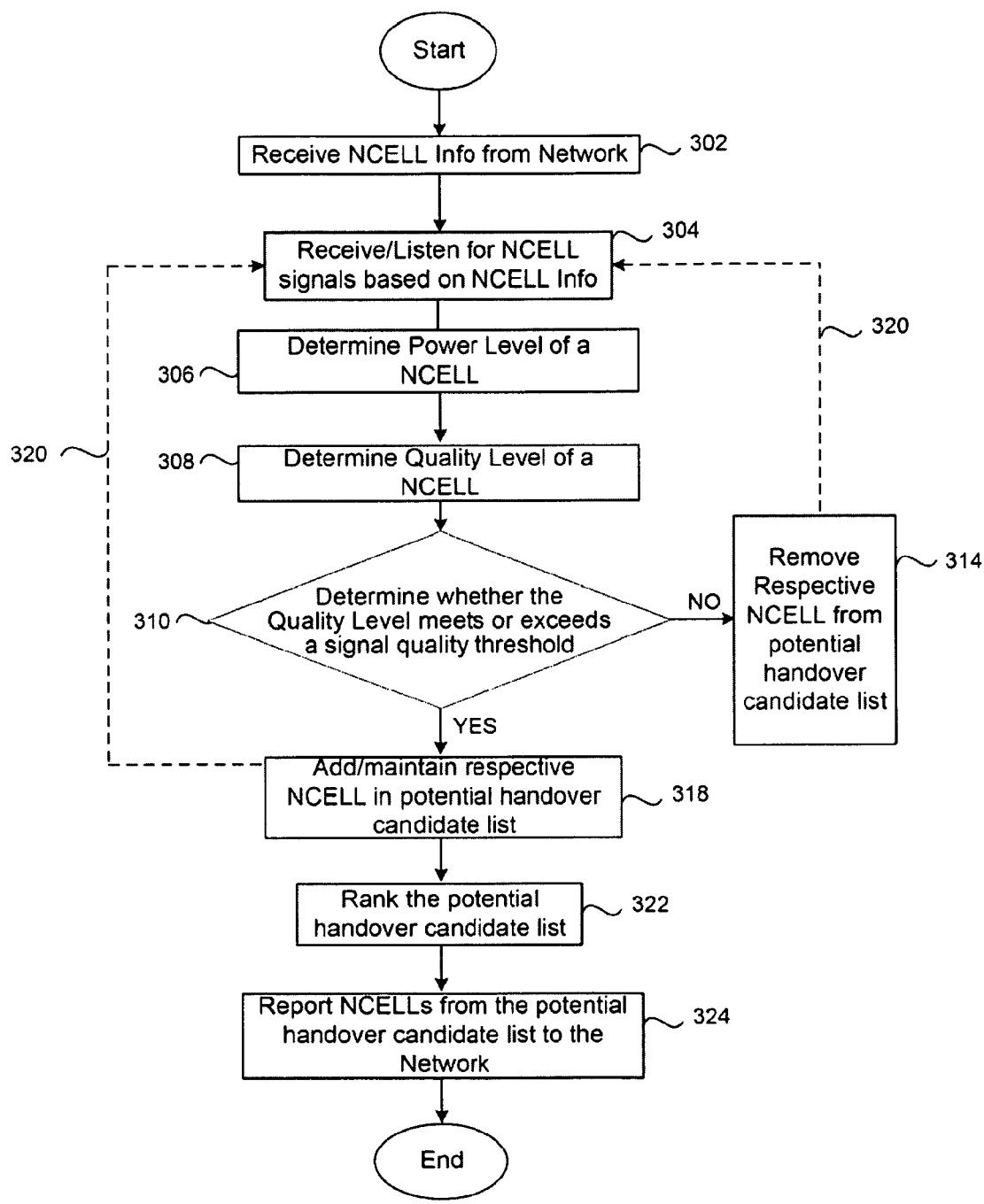
FIG. 3 is a flow chart illustrating a cell reselection operation in accordance with an aspect.

Turning now to the flow diagram 300 FIG. 3, in one aspect, a cell reselection operation considers signal quality in identifying handover candidates without requiring changes in the GSM messaging protocol. In a first step 302, a mobile device receives neighboring cell (NCELL) information from the network. NCELL may also be referred to by the term base station as an NCELL represents a neighboring base station. The NCELL information may include a neighbor list informing the mobile device of the nearby NCELLs, among other information. For example, the NCELL information may include, but is not limited to, one or more of a base station identifier, or a frequency identifier. Next, the mobile device may listen for and/or receive NCELL signals based upon the NCELL information received in step 302.

In the next steps 306 and 308, the mobile device determines the power level of the respective NCELL (306) and the quality level of the respective NCELL (308). The NCELL signals may include a pilot signal having a corresponding received power level, e.g., an RxLev, at the mobile device. Additionally, the NCELL signals may further correspond to a received quality level, e.g., an RxQual, at the mobile station. For example, the received quality level may be a measure of the received signal strength or power level relative to a measure of noise or interference, such as a signal to inference ratio (SIR) or a signal to noise ratio (SNR) or a signal to interference plus noise ratio (SINR). Next, at 310, the mobile device determines whether the quality level of the respective NCELL meets or exceeds a signal quality threshold level. The signal quality threshold level may be one or more of a desired SIR, SNR or SINR, for example, based upon historical information indicating the probability of the success of handovers in scenarios with the respective SIR, SNR or SINR.

At 314, if the signal quality of the respective NCELL is below the signal quality threshold level, the respective NCELL may be removed, or filtered, from a potential handover candidate list the mobile device sends to the network. Thus, in one aspect, the NCELLs with a poor signal quality level are not included in the potential handover candidate list reported to the network even if they have a high signal strength. However, if the signal quality of the respective NCELL is equal to or above the signal quality threshold level, at 318, the respective NCELL may be maintained in or added to the potential handover candidate list. At 320, the process may repeat from step 306 until the mobile device receives power and quality levels from all the neighboring NCELLs. In another aspect, the process may repeat from step 306 based on a time period for checking the power and quality levels of the surrounding NCELLs.

Next, at 322, the mobile device ranks the NCELLs included in the potential handover candidate list, e.g. NCELLs meeting the quality threshold and having the highest signal strength. In an aspect, for example, the potential handover candidate list may be ranked by signal quality level in descending order, e.g. with the NCELL having the highest signal quality level at the top of the list. In other aspects, for example, potential handover candidate list may be ranked by signal strength in descending order, e.g. with the NCELL having the highest signal strength at the top of the list. In yet other aspects, the potential handover candidate list may be ranked based primarily on one of the signal strength or the signal quality, and secondarily based on the other one of the signal strength or the signal quality. For example, the list may be primarily ranked in order of highest signal strength and secondarily ranked in order of highest signal quality, or primarily ranked in order of highest signal quality and secondarily ranked in order of highest signal strength.

After the mobile device ranks the potential handover candidate list, the mobile device may report a number of NCELLs from the potential handover candidate list to the network at 324. The potential candidate list may include, for example, a respective NCELL base station identity code (BSIC), a NCELL frequency identifier and the received signal strength of the respective NCELL. In an aspect, the mobile device may report the top six NCELLs from the potential handover candidate list to the network based on the desired ranking methodology. In another aspect, if there is only one NCELL near the mobile device, the mobile device may still report the NCELL to the network even if the quality level is below the signal quality threshold level. Further, for example, the mobile device may forward the potential handover candidate list to the network in a measurement report. The measurement report may contain information element (IE) measurement results for the respective NCELLs identified in the potential handover candidate list, as well as information pertaining to the serving base station. The IE measurement results may include, for example, the received signal strength and signal quality of the serving base station along with the number of NCELLs included in the measurement report. In an aspect, for each NCELL included in the measurement report, the IE measurement results may include, for example, the respective NCELL's BSIC, frequency identifier, and received signal strength.

Figure 4:
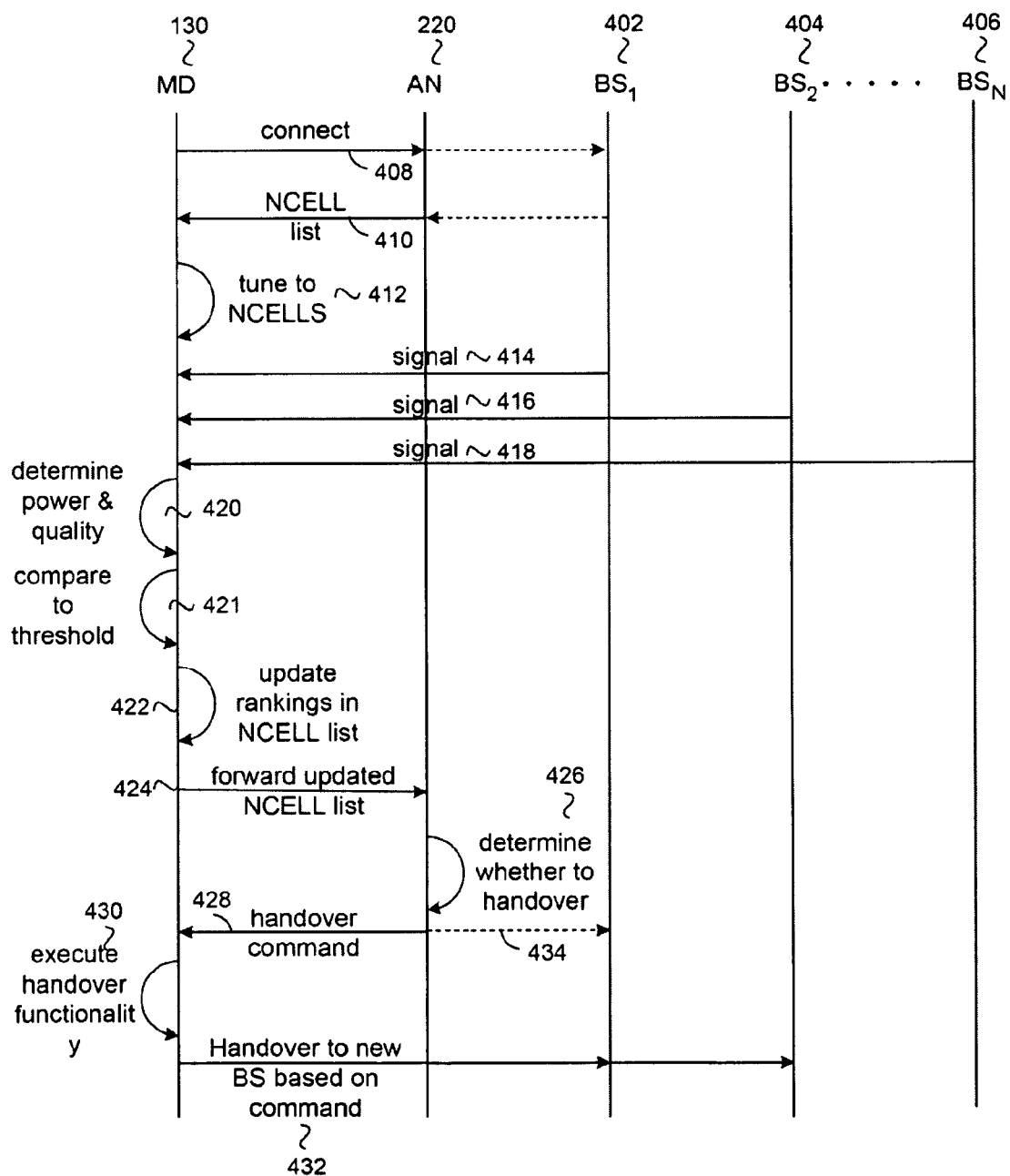
FIG. 4 is an illustration of an example methodology that facilitates a cell reselection operation in accordance with an aspect.

Referring now to FIG. 4, illustrated is an example methodology 400 of a cell reselection operation, as discussed above in reference to FIG. 3. At 408, mobile device 130 may establish an initial connection with a first base station 402, allowing mobile device 130 to receive information from base station 402. For example, for a mobile device operating in a GSM system, once in a voice call, the mobile device receives a GSM NCELL list on one of the Dedicated Control Channels (DCCHs), such as the Slow Associated Control Channel (SACCH), in a connected mode. In another aspect, in a GSM system, the mobile device receives the GSM NCELL list as part of measurement information received on a Broadcast Control Channel (BCCH) of the serving cell. At 410, the information received from access network 220 may include an NCELL list indicating which NCELLs are near mobile device 130, among other information. At 412, after mobile device 130 receives the NCELL list from access network 220, mobile device 130 may tune to the neighboring NCELLs. Tuning to the neighboring NCELLs may include, for example, receiving and/or listening for NCELLs signals.

At 414, 416 and/or 418, mobile device 130 may receive one or more signals from up to N neighboring base stations (BS) 402, 404 and 406, respectively, where N is an integer. At 420, mobile device 130 measures the power and quality level of the respective signals received at one or more of 414, 416 and/or 418. And, at 421, mobile device 130 may determine whether the measured power and quality level meets or exceeds a signal quality threshold for each respective signal. Further, at 421, for a number of the strongest signals meeting the quality level threshold, the mobile device performs a Synchronization Channel (SCH) decode to obtain a Base Station Identity Code (BSIC) of the corresponding base station. At 422, mobile device 130 may update the rankings in a potential handover candidate list according to the determination made in regards to the signal strength and quality level of the respective base station. For example, base stations that do not meet the signal quality threshold may be removed from the potential handover candidate list reported to the access network 220. For example, in one aspect, the potential handover candidate list may include the BSIC and the corresponding RxLev. In order to avoid changes to existing protocols, for example, in one aspect, the signal quality level measured by the mobile device for the respective BSIC may not be included in the potential handover candidate list, but may instead be stored locally on the mobile device for use in ranking BSICs in the potential handover candidate list. In other aspects, however, the measured signal quality level may be reported to the network. Once mobile device 130 updates the potential handover candidate list of NCELLs, at 424, mobile device may forward the updated potential handover candidate list to access network 220. For example, in GSM, the mobile device may include a measurement report in the next SACCH message block. For example, the measurement report may include the RxLev for the broadcast control channel (BCCH) carrier for six neighboring cells with the highest RxLev, and meeting the signal quality threshold, among those with known and allowed network color code (NCC) part of the BSIC.

At 426, upon receipt of the potential handover candidate list, access network 220 may determine whether to handover the mobile device to another base station. The determination to handover a mobile device may be based upon one or more factors, such as whether the current and neighboring base stations are congested, whether interference is occurring on a particular base station, or the load distribution of the network, among other factors. If the access network 220 decides to handover the mobile device to a neighboring base station, at 428, the access network 220 sends a handover command to mobile device 130 with a base station identity code (BSIC) parameter identifying the neighboring base station to which the call will be handed over. Additionally, in some aspects, at 434, access network 220 may provide notice of the impending handover to the respective base station to which the call will be handed over. At 430, once mobile device 130 receives a handover command from access network 220, mobile device 130 may execute a handover function causing mobile device 130, at 432, to handover the call to the new base station in accordance with the handover command.

Figure 5:
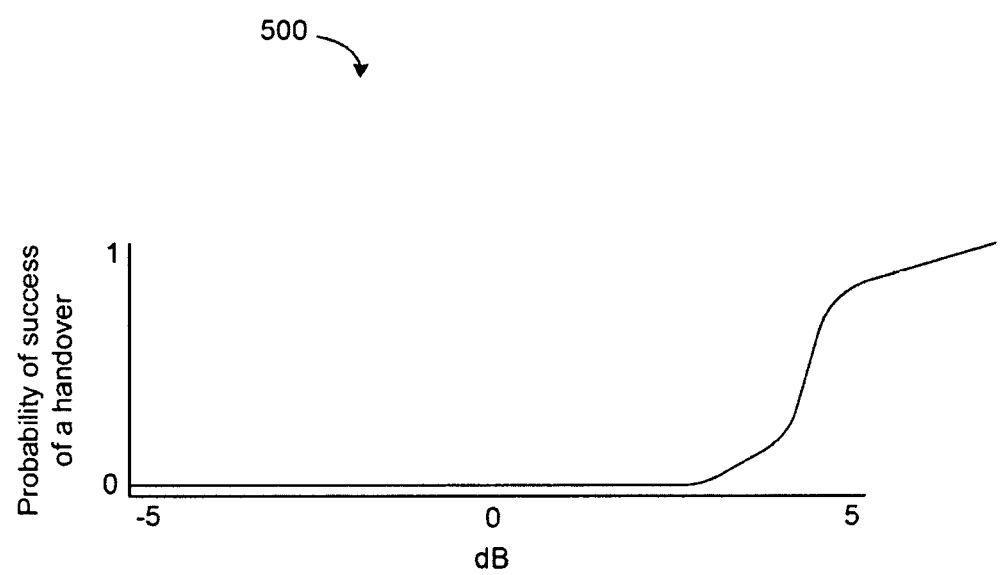
FIG. 5 is a graph showing the probability of success of a handover from one cell to another in accordance with an aspect.

Turning now to FIG. 5, illustrated in FIG. 5, is an example graph 500 indicating the probability of success of a handover from one cell to another, in accordance with an aspect. The signal quality threshold may be determined based upon historical data complied and averaged from handovers occurring over a period of time. The historical data may include the success or failures of handovers, and network conditions in which the handover occurred, among other historical data. Thus, the historical data may be optimized to produce a probability of success for a handover, as illustrated in graph 500.

In this example, graph 500 compares the probability of success of a handover from 0 to 1 on the y-axis versus the signal quality, measured in and ranging from −5 dB to 5 dB on the x-axis. Graph 500 indicates a handover, according to this aspect, at 5 dB would have about a 99.9% chance of success and a handover occurring at −5 dB would have about a 0.1% chance of success. Therefore, as one example, the signal quality threshold in this aspect may be set at 5 dB to ensure a high probability of success. It should be noted, however, that different probability of successes may be selected. Thus, in this example, an NCELL with a quality level below 5 dB may be considered to have a low quality level and may be removed from the NCELL potential handover list provided to the access network (FIG. 3, act 314). And an NCELL with a quality level at or above 5 dB, may continue to be reported in the NCELL potential handover list provided to the access network (FIG. 3, act 318). In an aspect, the signal quality threshold may be customizable. For example, the customization of the signal quality threshold may be based upon a respective mobile device, a group of NCELLs, and a range of dB's, among other customizations.

Figure 6:
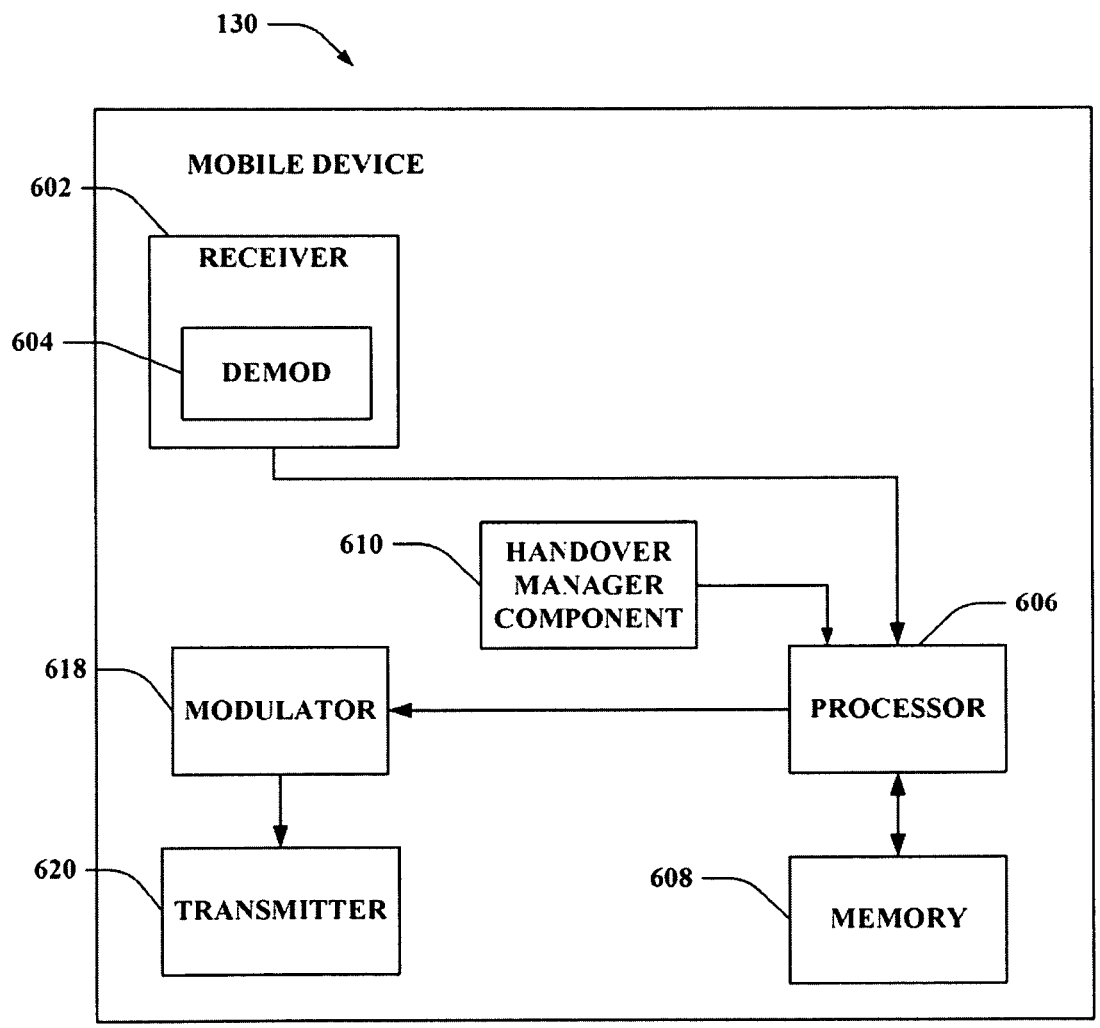
FIG. 6 is an illustration of an example mobile device for employment within a cellular wireless communication system in accordance with an aspect.

Referring now to FIG. 6, illustrated is an example mobile device 130 for employment within a cellular wireless communication system in accordance with an aspect. Mobile device 130 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 may comprise a demodulator 604 that may demodulate received symbols and provide them to a processor 606. Processor 606 can be a processor dedicated to analyzing information received by receiver 602 and/or generating information for transmission by a transmitter 620, a processor that controls one or more components of mobile device 130, and/or a processor that both analyzes information received by receiver 602, generates information for transmission by transmitter 620, and controls one or more components of mobile device 130.

Mobile device 130 can additionally comprise memory 608 that is operatively coupled to processor 606 and that can store data to be transmitted, received data, information related to potential handover NCELLs, data associated with analyzed signal and/or interference strength, data associated with analyzed signal quality levels, information related to an assigned channel, power, rate, or the like, and any other suitable information for indicating an available NCELL. Memory 608 can additionally store protocols and/or algorithms associated with adding and/or removing NCELLs from potential handover candidate lists.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Mobile device 130 still further comprises a modulator 618 and transmitter 620 that respectively modulate and transmit signals to, for instance, a network, a base station, another mobile device, etc. This can operate as part of a disparate bidirectional wireless network utilized to communicate non-broadcast information (such as content policy modifications, etc.) Although depicted as being separate from the processor 606, it is to be appreciated that the modulator 618 can be part of the processor 606 or multiple processors (not shown).

In addition, mobile device 130 includes a handover manager component 610 for monitoring the signals received by receiver 602, managing the potential handover candidate list, and managing the reporting of the potential handover candidate reported list to the access network.

Figure 7:
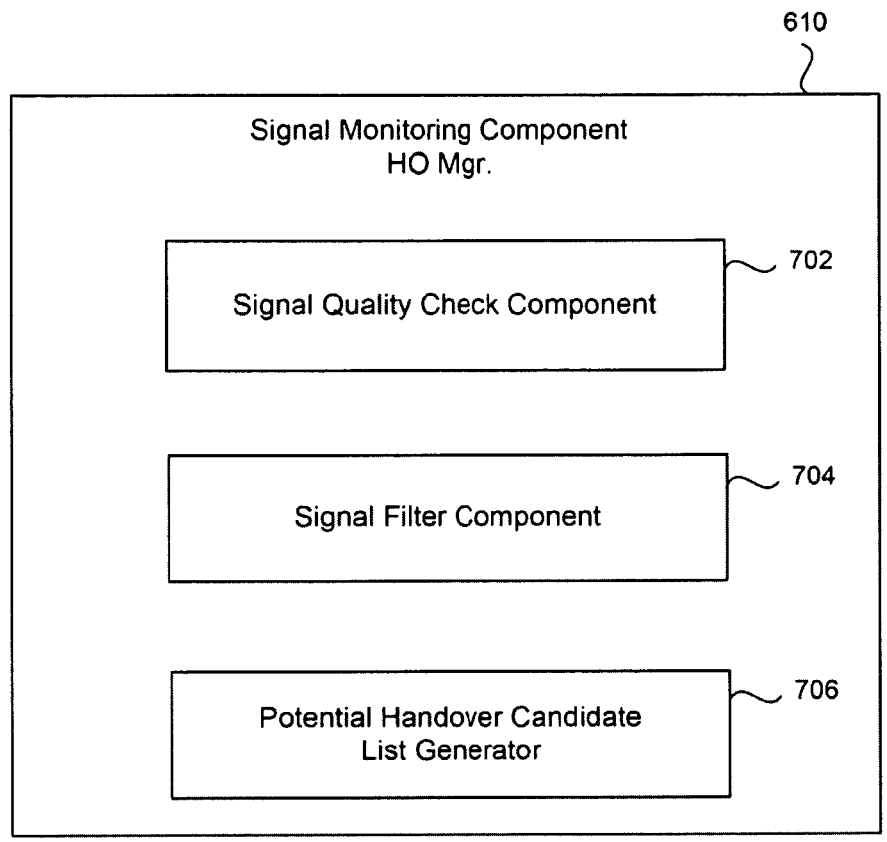
FIG. 7 is an illustration of an example of a signal monitoring component for employment within a cellular wireless communication system in accordance with an aspect.

Turning to FIG. 7, illustrated is an example handover manager component 610 in accordance with one aspect. Handover manager component 610, which can be any suitable combination of hardware and/or software, includes signal quality check component 702 which is operable for checking the quality level of a received signal from a NCELL. Further, signal monitoring component 610 includes signal filter component 704 which is operable for filtering and/or removing NCELLs from the potential handover candidate list. Moreover, signal monitoring component 610 includes potential handover candidate list generator 706 which is operable for generating a potential handover list for sending to the network.

Figure 8:
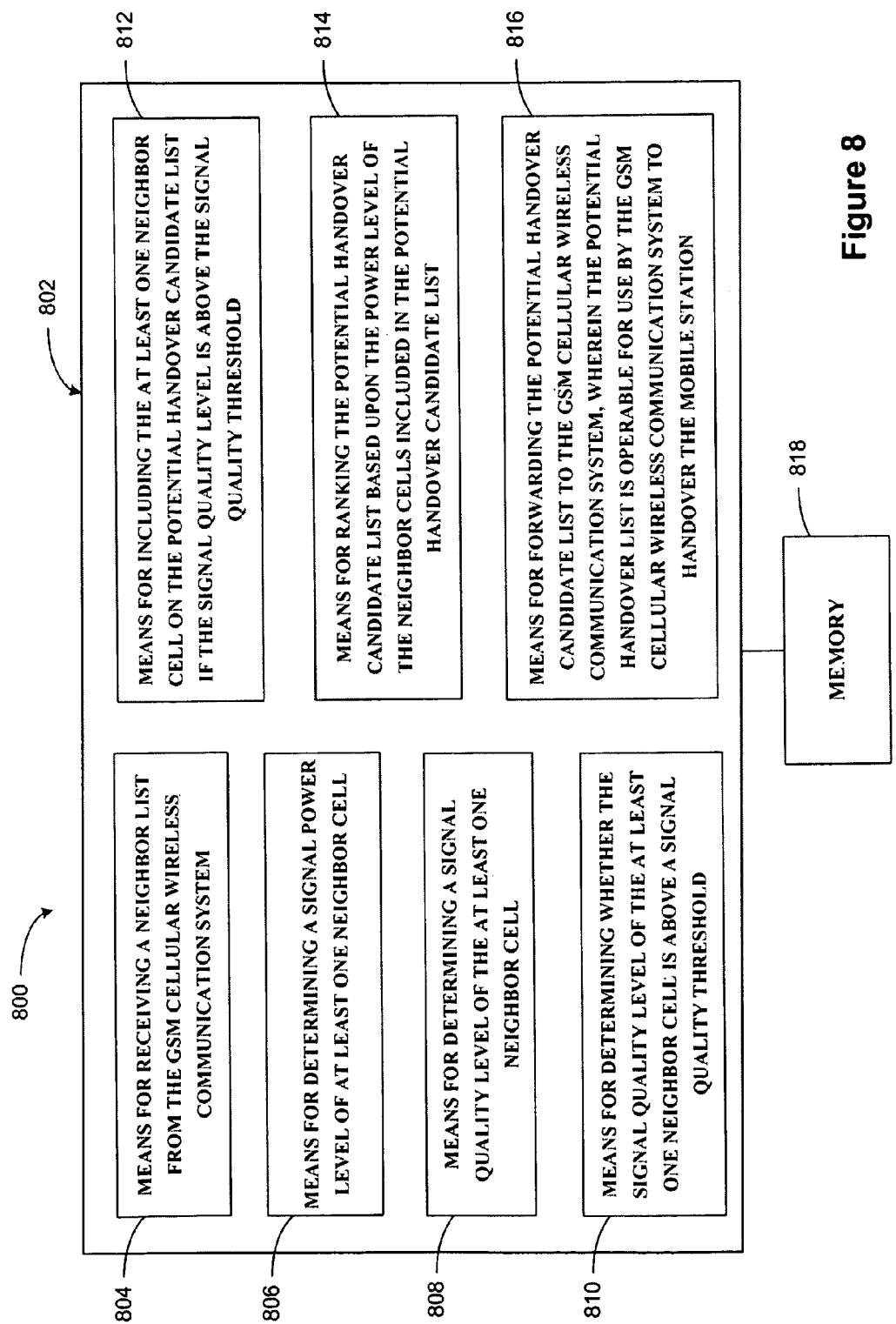
FIG. 8 is an illustration of an example system that facilitates a cell reselection operation in accordance with an aspect.

Referring now to FIG. 8, illustrated is a system 800 that receives and processes messages received over a wireless media broadcast network. For example, system 800 can reside at least partially within a transmitter, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 may include means for receiving a neighbor list from the GSM cellular wireless communication system 804. Further, logical grouping 802 may comprise means for determining a signal power level of at least one neighbor cell 806.

Furthermore, logical grouping 802 may comprise means for determining a signal quality level of the at least one neighbor cell 808. Moreover, logical grouping 802 may comprise means for determining whether the signal quality level of the at least one neighbor cell is above a signal quality threshold 810. Additionally, logical grouping 802 may include means for including the at least one neighbor cell on the potential handover candidate list if the signal quality level is above the signal quality threshold 812. In addition, logical grouping 802 may comprise means for ranking the potential handover candidate list based upon the power level of the neighbor cells included in the potential handover candidate list 814.

Moreover, logical grouping 802 may include means for forwarding the potential handover candidate list to the GSM cellular wireless communication system, wherein the potential handover list is operable for use by the GSM cellular wireless communication system to handover the mobile station 816. Additionally, system 800 can include a memory 818 that retains instructions for executing functions associated with electrical components 804, 806, 808, 810, 812, 814 and 816. While shown as being external to memory 816, it is to be understood that one or more of electrical components 804, 806, 808, 810, 812, 814 and 816 can exist within memory 818.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method comprising:
    receiving a neighbor list at a mobile station from a base station of a first cell, wherein the first cell is included in a wireless communication system;
    receiving a signal at the mobile station from a base station of at least one neighbor cell, wherein the base station of the at least one neighbor cell is identified in the neighbor list;
    determining, at the mobile station, a signal quality level of the signal, wherein the signal quality level comprises at least one of a signal to noise ratio, a signal to interference ratio, or a signal to interference plus noise ratio;
    determining whether the signal quality level of the signal satisfies a signal quality threshold;
    adding an identifier of the at least one neighbor cell to a potential handover candidate list of neighbor cells in response to the signal quality level of the signal satisfying the signal quality threshold, wherein each of the neighbor cells identified in the potential handover candidate list has a corresponding signal quality level, and wherein the signal quality threshold is set at a decibel (dB) level corresponding to a target handover success rate based on historical data, wherein the historical data comprises data compiled and averaged from handovers that occurred over a period of time; and
    ranking, at the mobile station, the neighbor cells identified in the potential handover candidate list based on the respective corresponding signal quality levels to produce an ordered list, wherein the identifier of the at least one neighbor cell is added at a position within the ordered list based on the corresponding signal quality level.

2. The method of claim 1, further comprising initiating a handover of a mobile station call from the first cell to a selected neighbor cell identified by the wireless communications system from the potential handover candidate list.

3. The method of claim 2, wherein the signal quality level of the selected neighbor cell exceeds the corresponding signal quality level of each of the neighbor cells other than the selected neighbor cell identified in the potential handover candidate list.

4. The method of claim 1, further comprising excluding the at least one neighbor cell from the potential handover candidate list in response to the signal quality level being below the signal quality threshold.

5. The method of claim 1, wherein receiving the neighbor list further comprises receiving the neighbor list via a slow associated control channel (SACCH) message.

6. The method of claim 5, wherein the SACCH message includes a base station identity code (BSIC).

7. The method of claim 6, further comprising performing a synchronization channel (SCH) decode for obtaining the BSIC.

8. The method of claim 1, further comprising, after ranking each of the neighbor cells identified in the potential handover candidate handoff list, forwarding the ordered list to the wireless communication system, wherein the ordered list is used by the wireless communication system to select a neighbor cell for initiating a handover of the mobile station.

9. The method of claim 1, wherein the signal quality threshold is customizable based on a mobile device type.

10. The method of claim 1, wherein ranking the neighbor cells within the potential handover candidate list comprises:
   performing a first ranking of the neighbor cells based on the corresponding signal quality level of each of the neighbor cells; and
   in response to determining that two or more of the neighbor cells have corresponding signal quality levels that are equal, performing a second ranking of the two or more neighbor cells based on a corresponding signal power level of the two or more neighbor cells.

11. The method of claim 1, wherein the signal quality threshold includes a range of dBs.

12. The method of claim 1, wherein the signal quality threshold is approximately 5 dB.

13. The method of claim 1 further comprising determining a signal power level of the signal at the mobile station.

14. The method of claim 1, wherein the neighbor cells identified in the ordered list are presented in a descending order based on a signal quality level, wherein a neighbor cell having a highest signal quality level is identified in a first position of the ordered list.

15. The method of claim 1, wherein the target handover success rate is 99.9%.

16. The method of claim 1, wherein the historical data includes information regarding network conditions that occurred over the period of time, or a combination thereof.

17. The method of claim 1, wherein in response to determining that two or more neighbor cells have corresponding signal quality levels above the signal quality threshold, determining whether the two or more neighbor cells have corresponding signal quality levels above a second threshold; and
   performing a second ranking of the two or more neighbor cells with a signal quality level over the second signal quality threshold based on a corresponding signal power level of the two or more neighbor cells.

18. A computer program product comprising:
   a non-transitory computer-readable medium of a mobile station, the non-transitory computer-readable medium comprising instructions that cause a computer to:
      receive a neighbor list from a base station of a first cell, wherein the first cell is included in a wireless communication system;
      receive a signal from a base station of at least one neighbor cell, wherein the at least one neighbor cell is identified in the neighbor list;
      determine a signal quality level of the signal, wherein the signal quality level comprises at least one of a signal to noise ratio, a signal to interference ratio, or a signal to interference plus noise ratio;
      determine whether the signal quality level of the signal satisfies a signal quality threshold;
      add an identifier of the at least one neighbor cell to a potential handover candidate list of neighbor cells in response to the signal quality level satisfying the signal quality threshold, wherein each of the neighbor cells identified in the potential handover candidate list has a corresponding signal quality level, and wherein the signal quality threshold is set at a decibel (dB) level corresponding to a target handover success rate based on historical data, wherein the historical data comprises data compiled and averaged from handovers that occurred over a period of time; and
      rank the neighbor cells identified in the potential handover candidate list based on the respective corresponding signal quality levels to produce an ordered list, wherein the identifier of the at least one neighbor cell is added to a position within the ordered list based on the corresponding signal quality level.

19. The computer program product of claim 18, wherein each of the neighbor cells included in the potential handover candidate list includes a corresponding signal power level, wherein ranking the neighbor cells identified in the potential handover candidate list is further based on the corresponding signal power level.

20. An apparatus comprising:
   means for receiving a neighbor list at a mobile station from a base station of a first cell, wherein the first cell is included in a wireless communication system;
   means for receiving a signal at the mobile station from a base station of at least one neighbor cell, wherein the at least one neighbor cell is identified in the neighbor list;
   means for determining a signal quality level of the signal, wherein the signal quality level comprises at least one of a signal to noise ratio, a signal to interference ratio, or a signal to interference plus noise ratio;
   means for determining whether the signal quality level of the signal satisfies a signal quality threshold;
   means for adding an identifier of the at least one neighbor cell to a potential handover candidate list of neighbor cells in response to the signal quality level satisfying the signal quality threshold, wherein each of the neighbor cells identified in the potential handover candidate list has a corresponding signal quality level, and wherein the signal quality threshold is set at a decibel (dB) level corresponding to a target handover success rate based on historical data, wherein the historical data comprises data compiled and averaged from handovers that occurred over a period of time; and
   means for ranking the neighbor cells identified in the potential handover candidate list based on the respective corresponding signal quality levels to produce an ordered list, wherein the identifier of the at least one neighbor cell is added at a position within the ordered list based on the corresponding signal quality level.

21. The apparatus of claim 20, wherein each of the neighbor cells included in the potential handover candidate list includes a corresponding signal power level, wherein the means for ranking the neighbor cells identified in the potential handover candidate list is further based on the corresponding signal power level.

22. An apparatus comprising:
a receiver operable to receive a neighbor list from a base station of a first cell, wherein the first cell is included in a wireless communication system; and
a handover manager component operable to:
receive a signal from a base station of at least one neighbor cell, wherein the at least one neighbor cell is identified in the neighbor list;
determine a signal quality level of the signal, wherein the signal quality level comprises at least one of a signal to noise ratio, a signal to interference ratio, or a signal to interference plus noise ratio;
determine whether the signal quality level of the signal satisfies a signal quality threshold; and
add an identifier of the at least one neighbor cell to a potential handover candidate list of neighbor cells in response to the signal quality level satisfying the signal quality threshold, wherein each of the neighbor cells identified in the potential handover candidate list has a corresponding signal quality level, wherein the signal quality threshold is set at a decibel (dB) level corresponding to a target handover success rate based on historical data, wherein the historical data comprises data compiled and averaged from handovers that occurred over a period of time; and
rank the neighbor cells identified in the potential handover candidate list based on the respective corresponding signal quality levels to produce an ordered list, wherein the identifier of the at least one neighbor cell is added at a position within the ordered list based on the corresponding signal quality level.

23. The apparatus of claim 22, wherein the handover manager component is operable to initiate a handover of a mobile station call from the first cell to a selected neighbor cell identified by the wireless communication system from the potential handover candidate list.

24. The apparatus of claim 23, wherein the signal quality level of the selected neighbor cell exceeds the corresponding signal quality level of each of the neighbor cells other than the selected neighbor cell in the potential handover candidate list.

25. The apparatus of claim 22, wherein the handover manager component is operable to exclude the at least one neighbor cell from the potential handover candidate list in response to the signal quality level not satisfying the signal quality threshold.

26. The apparatus of claim 22, wherein the receiver is operable to receive the neighbor list via a slow associated control channel (SACCH) message that includes a base station identity code (BSIC).

27. The apparatus of claim 26, wherein the receiver is operable to perform a synchronization channel (SCH) decode for obtaining the BSIC.

28. A processor of a mobile station configured to execute instructions stored at a non-transitory computer readable medium, the instructions causing the processor to:
receive a neighbor list from a base station of a first cell, wherein the first cell is included in a wireless communication system;
receive a signal from a base station of at least one neighbor cell, wherein the base station of the at least one neighbor cell is identified in the neighbor list;
determine a signal quality level of the signal, wherein the signal quality level comprises at least one of a signal to noise ratio, a signal to interference ratio, or a signal to interference plus noise ratio;
determine whether the signal quality level of the signal satisfies a signal quality threshold; and
add an identifier of the at least one neighbor cell to a potential handover candidate list of neighbor cells in response to the signal quality level of the signal satisfying the signal quality threshold, wherein each of the neighbor cells identified in the potential handover candidate list has a corresponding signal quality level, wherein the signal quality threshold is set at a decibel (dB) level corresponding to a target handover success rate based on historical data, wherein the historical data comprises data compiled and averaged from handovers that occurred over a period of time; and
rank the neighbor cells identified in the potential handover candidate list based on the respective corresponding signal quality levels to produce an ordered list, wherein the identifier of the at least one neighbor cell is added at a position within the ordered list based on the corresponding signal quality level.

29. The processor of claim 28, wherein each of the neighbor cells identified in the potential handover candidate list includes a corresponding signal power level, wherein ranking the neighbor cells within the potential handover candidate list is further based on the corresponding signal power level.

* * * * *